United States Patent
Fonseka et al.

(10) Patent No.: US 10,248,809 B1
(45) Date of Patent: Apr. 2, 2019

(54) SYSTEM AND METHOD FOR AUTOMATICALLY SECURING SENSITIVE DATA IN PUBLIC CLOUD USING A SERVERLESS ARCHITECTURE

(71) Applicant: CAPITAL ONE SERVICES, LLC, McLean, VA (US)

(72) Inventors: Nathal L Fonseka, Philadelphia, PA (US); Ankit Pansari, Jersey City, NJ (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 15/955,359

(22) Filed: Apr. 17, 2018

Related U.S. Application Data

(63) Continuation of application No. 15/950,551, filed on Apr. 11, 2018, now Pat. No. 10,121,021.

(51) Int. Cl.
| | |
|---|---|
| *G06F 21/60* | (2013.01) |
| *G06F 21/62* | (2013.01) |
| *G06F 17/30* | (2006.01) |
| *G06F 16/16* | (2019.01) |

(52) U.S. Cl.
CPC ........ *G06F 21/6218* (2013.01); *G06F 16/162* (2019.01); *G06F 17/30117* (2013.01); *G06F 21/602* (2013.01); *G06F 21/604* (2013.01)

(58) Field of Classification Search
CPC .... G06F 21/60–21/606; G06F 21/6209; G06F 21/6218; G06F 21/6227; G06F 21/6245; G06F 21/6254; G06F 17/30117; G06F 3/0652; H04L 63/0428
See application file for complete search history.

(56) References Cited

U.S. PATENT DOCUMENTS

| | | | |
|---|---|---|---|
| 8,776,249 B1 * | 7/2014 | Margolin | G06F 21/606 380/277 |
| 9,419,841 B1 * | 8/2016 | Kozolchyk | H04L 9/3239 |
| 9,519,802 B2 * | 12/2016 | Dutta | G06F 21/602 |
| 9,740,876 B1 * | 8/2017 | Nachenberg | G06F 21/6218 |
| 2002/0073099 A1 | 6/2002 | Gilbert et al. | |
| 2004/0078238 A1 | 4/2004 | Thomas et al. | |
| 2004/0199781 A1 | 10/2004 | Erickson et al. | |
| 2011/0307710 A1 | 12/2011 | McGuire et al. | |
| 2017/0126638 A1 * | 5/2017 | Ye | G06F 21/602 |
| 2018/0007050 A1 * | 1/2018 | Ruggiero | G06F 12/1408 |

* cited by examiner

*Primary Examiner* — Minh Dinh
(74) *Attorney, Agent, or Firm* — Finnegan, Henderson, Farabow, Garrett & Dunner LLP

(57) ABSTRACT

Systems and methods are provided executing jobs immediately upon receipt of a notification. The systems and methods may include receiving, at a cloud compute service, a notification that a sensitive file comprising sensitive data has been received at a file receipt location, the sensitive file being sent by a client device; generating, by the cloud compute service, a container instance in response to the notification; retrieving, by the container instance, the sensitive file from the file receipt location; generating, by the container instance, a stripped file by stripping the sensitive data from the sensitive file based on a configuration file; transmitting, by the container instance, the stripped file to a storage location; deleting the sensitive file and associated file pointers from the file receipt location; and terminating the container instance, wherein terminating the container instance comprises deleting files comprising sensitive data and associated file pointers.

16 Claims, 3 Drawing Sheets

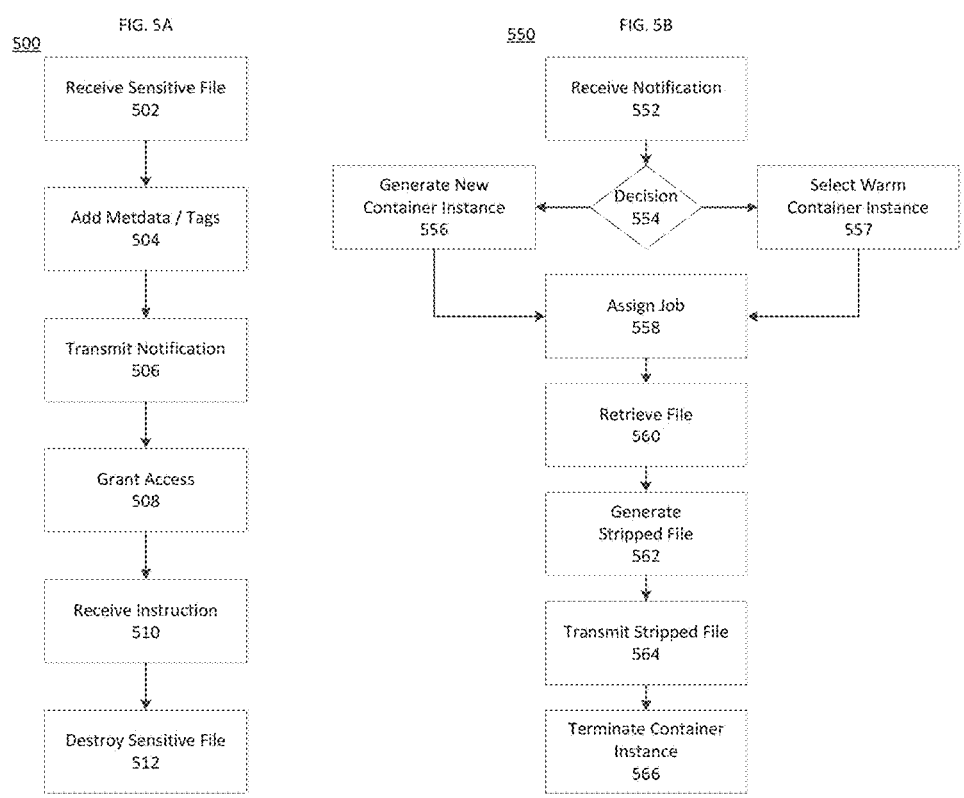

SYSTEM AND METHOD FOR AUTOMATICALLY SECURING SENSITIVE DATA IN PUBLIC CLOUD USING A SERVERLESS ARCHITECTURE

This application is a continuation of U.S. patent application Ser. No. 15/950,551 filed on Apr. 11, 2018, which is hereby incorporated by reference in the present application.

BACKGROUND

Transmitting files that includes sensitive personal data or confidential information in addition to innocuous or non-sensitive data is common in many sectors, including business, communications, education, and healthcare. For example, records of financial transactions sent between vendors and banking institutions may comprise personally identifiable information and account information along with details of a transaction that includes a payment amount. Medical records sent between healthcare providers and insurance companies may comprise sensitive health information along with general billing codes and procedures. Frequently, files comprising sensitive data are sent via networks and stored in databases residing on a cloud for future retrieval. Unauthorized access to such sensitive data is a concern. In addition, given the ubiquity of the high volume of file transmission needs, efficiency and performance of systems to process these files is a concern.

One approach to address the problem of unauthorized access involves removing or replacing sensitive data from files before transmitting them to a final destination, that is, "stripping" data from files. For example, there may be a need to remove or replace voter information, social security numbers, names, addresses, date of birth, account information, or a variety of personal identifiers. Removal refers to generating a file without strings of characters comprising sensitive information, such as a de-identified file that contains no personal identifiers. Replacement refers to transformation of strings of characters containing the sensitive information into another format that is not sensitive. Replacement methods include encryption or aggregation, in which specific data, such as an exact street address, are replaced by generalized data, such as a postal zip code. Thus, removal and replacement techniques generate files stripped of sensitive information. Such files are referred to as stripped files. Stripped files may consist of different levels of data stripping. That is, stripped files may be partially or completely stripped of sensitive data.

Indeed, regulations commonly impose requirements to remove or replace sensitive data and to store only stripped files. Frequently, this means immediate, real-time data processing to strip sensitive data in a stream of received files. For example, financial industry users may need to meet Payment Card Industry Data Security Standards (PCI-DSS) for storing data originally received in near continuous streams of transactions between merchants and banking institutions. Further, healthcare providers may need to meet Health Insurance Portability and Accountability (HIPPA) standards when transferring patient records between providers or between providers and insurance agencies. These exemplary applications of data stripping raise both security and performance concerns.

Often, one or more dedicated servers follow protocols to process data and route files between end users. Servers strip sensitive data in a near continuous stream of received files. The dedicated servers may receive files comprising sensitive data from one end user and strip the sensitive data before transmitting non-sensitive files to another end user.

Use of traditional, server-based systems for stripping sensitive information can present a security challenge to an organization. Memory blocks on the server comprise sensitive data and file pointers on the server may indicate the memory address of blocks of sensitive data. File pointers and memory blocks may persist at each step of a data stripping process, resulting in a chain of file pointers that may be followed from the file stripped of sensitive data back to the original file comprising sensitive data by unauthorized users. Traditional systems relying on servers may process large quantities of sensitive data on a single server. For example, servers that process credit card transactions and send information between vendors and banking institutions may receive thousands of files comprising sensitive account information about millions of accounts each day. If those servers are compromised, a significant amount of sensitive data may be at risk.

In addition, traditional server-based data processing methods to strip sensitive data from files suffer from limitations in scalability and efficiency. During a surge of received files, server-based data processing may face challenges with process scheduling. That is, server-based data processing may be unable to effectively assign priority of execution, manage load balancing, allocate memory use, predict resource availability, or work within time constraints. During inactive periods in which few files are received, server-based data processing methods may face inefficiencies and unnecessary costs associated with idle capacity. Thus, server-based methods require developers to allocate resources for variable workloads in advance based on a set of potentially inaccurate assumptions.

In view of the shortcomings and problems with traditional methods of stripping sensitive data, an improved system and method for secure, real-file stripping is desired.

SUMMARY

The disclosed embodiments provide methods and systems for stripping sensitive data from sensitive files using a serverless architecture. By using a serverless architecture, disclosed embodiments improve the security, scalability, and efficiency of systems for real-time data processing to strip sensitive data from files. Thus, the disclosed embodiments provide enhancements to data processing of sensitive files and address problems with traditional methods of stripping sensitive data. The disclosed systems and methods are implemented using a combination of conventional hardware and software as well as specialized hardware and software, such as a machine constructed and/or programmed specifically for performing functions associated with the disclosed method steps.

Consistent with the present embodiments, a system comprising a cloud compute service for executing jobs immediately upon receipt of a notification is disclosed. The cloud compute service may comprise one or more hardware processors and a memory unit storing instructions executable by the one or more hardware processors to perform operations. The operations may comprise receiving, at a cloud compute service, a notification that a sensitive file comprising sensitive data has been received at a file receipt location, the sensitive file being sent by a client device; generating, by the cloud compute service, a container instance in response to the notification; retrieving, by the container instance, the sensitive file from the file receipt location; generating, by the container instance, a stripped file by stripping the sensitive data from the sensitive file based on a configuration file; transmitting, by the container instance, the stripped file to a storage location; deleting the sensitive file and associated file pointers from the file receipt location; and terminating the container instance, wherein terminating the container instance comprises deleting files comprising sensitive data and associated file pointers.

Consistent with the present embodiments, a method is disclosed. The method may comprise receiving, at a cloud compute service, a notification that a sensitive file comprising sensitive data has been received at a file receipt location, the sensitive file being sent by a client device; generating, by the cloud compute service, a container instance in response to the notification; retrieving, by the container instance, the sensitive file from the file receipt location; generating, by the container instance, a stripped file by stripping the sensitive data from the sensitive file based on a configuration file; transmitting, by the container instance, the stripped file to a storage location; deleting the sensitive file and associated file pointers from the file receipt location; and terminating the container instance, wherein terminating the container instance comprises deleting files comprising sensitive data and associated file pointers.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 5A is a flowchart of an exemplary data process at a file receipt location, consistent with disclosed embodiments.

FIG. 5B is a flowchart of an exemplary data process for stripping data from a file at a cloud compute service, consistent with disclosed embodiments.

DESCRIPTION OF THE EMBODIMENTS

Disclosed embodiments improve the security, scalability, and efficiency of systems for real-time data processing to strip sensitive data from files by using a serverless architecture. To achieve these improvements in data processing of files comprising sensitive data, the disclosed embodiments comprise triggering a notification to a processor in response to a received sensitive file, immediately generating a container instance to strip sensitive data from the sensitive file, transmitting the files to a storage location, and terminating the container instance.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
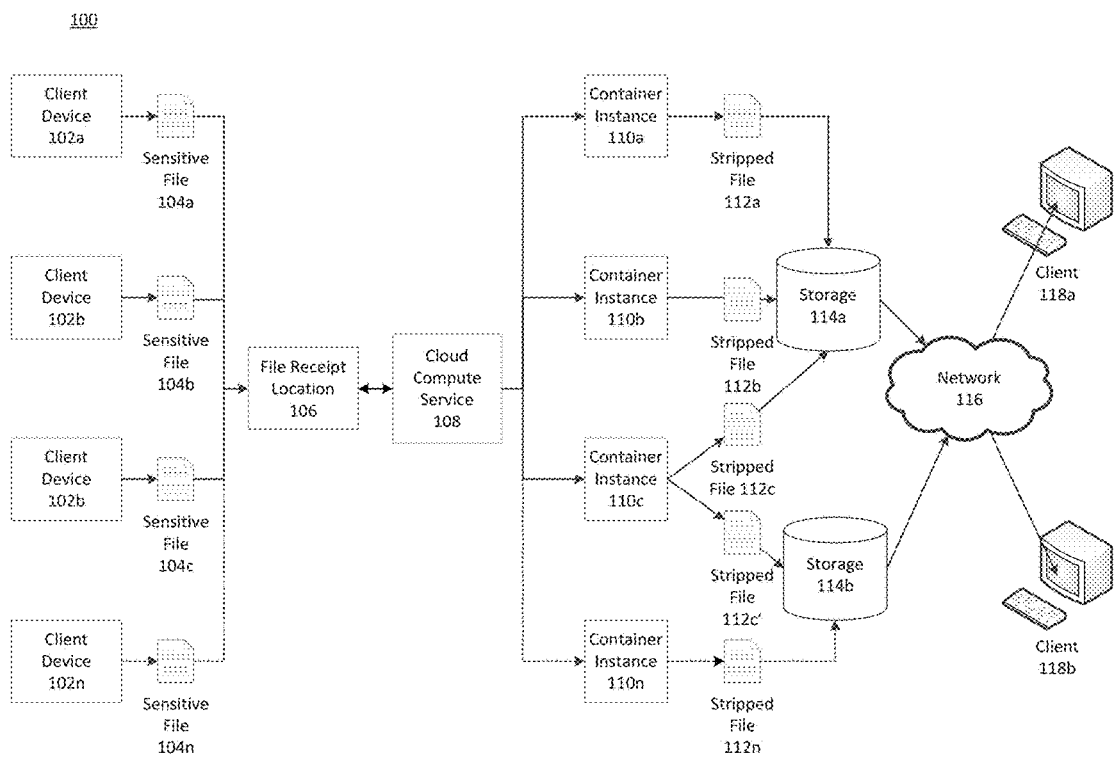
FIG. 1 is a diagram of an exemplary system environment for immediate processing of files that comprise sensitive data.

FIG. 1 is a diagram of an exemplary system environment using serverless architecture for immediate processing of files that comprise sensitive data, consistent with disclosed embodiments. In particular, FIG. 1 shows a diagram of an exemplary system 100, consistent with disclosed embodiments, revealing some technical aspects of the present disclosure for achieving the intended results of the present disclosure. System 100 may be implemented to immediately execute a job that processes a data file by, for example, generating a container instance to strip sensitive data in a sensitive file. System 100 is an example of a serverless architecture system found in applications in which files comprising sensitive data are received from client devices in a stream and jobs are immediately executed, wherein the jobs comprise stripping sensitive data. By generating and terminating a container instance in response to a received sensitive file, the present embodiments mitigates the risk of unauthorized access to sensitive data. Further, the embodiments allow for automatic scalability and improved efficiency by running code to generate container instances in response to a triggering event.

As shown in FIG. 1, system 100 may include a plurality of client devices 102a, 102b, 102c, and 102n respectively associated with sensitive files 104a, 104b, 104c, and 104n comprising sensitive data; a file receipt location 106; a cloud compute service 108; a plurality of container instances 110a, 110b, 110c, and 110n, each corresponding to data processes to perform on files 104a, 104b, 104c, and 104c, respectively; a plurality of stripped files 112a, 112b, 112c, 112c', and 112n associated with container instances 110a, 110b, 110c, and 110n; one more storage locations 114a, 114b; a network 116; and one or more end-user client devices 118a, 118b.

FIG. 1 is an exemplary configuration of system 100. As will be appreciated by one skilled in the art, the components and arrangement of components included in the serverless architecture of system 100 may vary. For example, as compared to the depiction in FIG. 1, system 100 may include a larger or smaller number of client devices 102, sensitive files 104, container instances 110, stripped files 112, storage locations 114, network 116, or client devices 118. In addition, system 100 may further include other components or devices that perform or assist in the performance of one or more processes consistent with the disclosed embodiments. The components and arrangements shown in FIG. 1 are not intended to limit the disclosed embodiments, as the components used to implement the disclosed processes and features may vary.

As depicted in FIG. 1, client devices 102a-n and 118a-b may be a variety of different equipment, such as personal computers, servers, mainframes, virtual machines, kiosks, credit card scanners, appliances, medical equipment, mobile devices, smartphones, tablets, thin clients, or the like. Client devices 102a-n and are connected to a public network. Client devices 118a-b are connected to network 116. Network 116 may be a public network or private network.

File receipt location 106 is a secure drop point on a public cloud configured to receive sensitive files 104a-n. Further detail of file receipt location 106 is provided with respect to FIG. 2.

Sensitive files 104a-n comprise sensitive data in addition to innocuous or non-sensitive data. Sensitive data may comprise, for example, at least one of an account number, a debit card number, a credit card identification number, a passport number, a driver's license number, a username, a password, a personal identifier, an address, or a location;

data relating to a consumer credit report, an educational matter, a legal matter, a governmental matter, a medical diagnosis, or a medical procedure; or other sensitive information. Sensitive files 104*a-n* may be encoded or encrypted.

Cloud compute service 108 comprises a set of processors and memory units located on a cloud configured to generate ephemeral container instances in response to notifications received from the file receipt location. Further detail of cloud compute service 108 is provided with respect to FIG. 3.

One or more of container instances 110*a-n* may comprise a stand-alone, executable package that includes code, runtime, system tools, system libraries, and settings that is configured to execute a job, the job comprising stripping sensitive data from files. Further detail of container instance 110 is provided with respect to FIG. 4.

Stripped files 112*a-n* comprise data based on sensitive files 104. Stripped files 112 are generated using one or both of data removal and data replacement techniques. Stripped files 112*a-n* may further comprise additional data not found in sensitive files 104.

Storage locations 114*a-b* may comprise a processor and a memory. One or more methods of data encryption may be used at data storage locations 114*a-b*. Data storage locations 114*a* and 114*b* may be connected to a network 116. Data storage locations 114*a* and 114*b* may be connected to the same network, as depicted in FIG. 1, or may be connected to different networks. In some embodiments, at least one of storage locations 114*a-b* is a relational database using Structured Query Language (SQL). Alternatively, storage locations 114*a-b* may be a non-relational or NoSQL databases employing bindings that includes at least one of Java®, Node.js®, go, C# .NET®, Perl®, PHP, Python®, Ruby®, Haskell and Erlang® or other language.

Network 116 may be, for example, a wired or wireless network, including, without limitation, a Local Area Network, a Wide Area Network, a Metropolitan Area Network, an IEEE 802.11 wireless network (e.g., "Wi-Fi"), a network of networks (e.g., the Internet) or the like. Client devices 118*a* and 118*b* may access data storage locations 114*a-b* through network 116. In some embodiments, network 116 may be secure and require a password to access the network.

Referring to FIG. 1 in greater detail, client device 102*a-n* may be configured to generate files comprising sensitive data and transmit those files to file receipt location 106. For example, client devices 102*a-n* may be configured to generate respective files 104*a-n* comprising sensitive data. In other embodiments, files 104*a-n* may originate outside the respective client device, so that a client device 102*a-n* first receives then transmits sensitive files 104*a-n* to file receipt location 106. In some embodiments, files 104*a-n* may be generated by another device in response to a tokenized request for sensitive data or derivatives of sensitive data.

In the embodiment of FIG. 1, file receipt location 106 is a secure drop point on a public cloud configured to receive files 104*a-n* comprising sensitive data. File receipt location 106 is configured to automatically transmit a push notification to cloud compute service 108, wherein the push notification triggers a data stripping process. In some embodiments, file receipt location 106 may be further configured to add metadata or tags to sensitive files 104*a-n*.

In the exemplary embodiment of FIG. 1, cloud compute service 108 receives a notification from file receipt location 106 and generates a corresponding container instance 110*a-n* for each sensitive file, 104*a-n*. As will be appreciated by one skilled in the art, other configurations are possible in which, for example, cloud compute service 108 generates a plurality of container instances 110 corresponding to a sensitive file 104.

Advantageously, cloud compute service 108 is scalable because container instances 110*a-n* are generated in real-time following a triggering event, the receipt of a push notification from file receipt location 106. Thus, cloud compute service 108 allocates resources based on a triggering event; no resources are used and no costs are incurred for idle capacity. As a further advantage, cloud compute service 108 may configure container instances 110*a-n* to terminate upon completion of a job, the job comprising stripping sensitive data from files 104*a-n*. Termination destroys container instances 110*a-n*. In this way, the serverless architecture of cloud compute service 108 is more efficient and secure than traditional, server-based architectures.

Still referring to FIG. 1, each container instance 110*a-n* performs functions comprising stripping sensitive data from a corresponding sensitive file 104*a-n* to generate stripped files 112*a-n*. Container instances 110*a-n* may decode or decrypt corresponding sensitive file 104*a-n*.

Container instances 110*a-n* execute functions to perform jobs and allocate memory blocks. Memory blocks may be associated with sensitive files 104*a-n*, blocks associated with stripped files 112*a-n*, and associated with other data. Further, container instances 110*a-n* generate pointers that indicate addresses of various memory blocks, including memory blocks associated with sensitive files 104*a-n*, stripped files 112*a-n*, and other data.

Advantageously, container instances 110*a-n* are ephemeral, with their provisioning based on a triggering event and their terminating based on completion of one or more jobs comprising stripping sensitive data from files. The jobs may comprise other functions. Terminating a container instance 110*a-n* comprises deleting files and associated file pointers in memory and may further comprise overwriting memory blocks.

Stripped files are generated based on sensitive files 104 and a configuration file. Further, stripped files 112*a-n* may comprise information not found in sensitive file 104.

Stripped files 112*a-n* may comprise files generated using different levels of data stripping ranging from completely stripped to partially stripped. Completely stripped files contain no sensitive data while partially stripped files comprise some sensitive data. In some embodiments, stripped files 112*a-n* may be generated using data replacement techniques and contain data that replaces sensitive data. For example, replacement data may comprise encrypted data or aggregated data. For example, the data may comprise a street address, which may be aggregated as a postal zip code in a stripped file 112. As a further example, the data may comprise a credit card account number, which may be encrypted in a stripped file 112. Alternatively, stripped files 112*a-n* may be generated using data removal techniques. In some embodiments, stripped files 112*a-n* may be generated using a mix of replacement and removal techniques.

In the example of FIG. 1, container instance 110*c* generates stripped files 112*c* and 112*c'*. Stripped file 112*c* and 112*c'* are distinct files comprising different data. For example, stripped file 112*c'* may contain more sensitive data than stripped file 112*c*. That is, each of sensitive files 112*c* and 112*c'* has a different level of stripping. Further, stripped file 112*c'* may contain information generated by container 110*c* that is not found in stripped file 112*c*.

As illustrated in FIG. 1, container instances 110*a-n* transmit stripped files 112*a-n* to data storage locations 114*a-b*. In some embodiments, transmitting stripped files 112*a-n* may comprise encoding or encrypting the files. Transmitting stripped files 112a-n may comprise using secure file transmission methods like, for example, SSH.

Container instances 110a-n are configured to flexibly transmit corresponding stripped files 112a-n to one or more data storage location 114a-b. In the exemplary embodiment of FIG. 1, data storage location 114a receives files 112a-c, while exemplary data storage location 114b receives files 112c' and 112n. As will be appreciated by one skilled in the art, other configurations are possible, in which, for example, an exact copy of an individual stripped file 112a-n is sent to more than one data storage location 114.

Still referring to FIG. 1, data storage location 114a and 114b may comprise different levels of security and contain varying amounts of sensitive data. In some embodiments, data storage location 114a or 114b is public facing and requires no authentication to access and download data contained in stripped files 112a-n. In other embodiments, one or both of 114a and 114b comprise or are associated with an authentication system configured to conditionally allow access to data contained in stripped files 112 upon successful completion of an authentication process. For example, data storage location 114b may be accessible only to users having user accounts belonging to a specific group and require an authentication process, while data storage location 114a may be accessible to anyone in the general public who requests a user account and successfully completes an authentication process. As will be appreciated by one skilled in the art, other configurations of system 100 are possible involving more data storage locations 114 with varying levels of security and accessibility.

Figure 2:
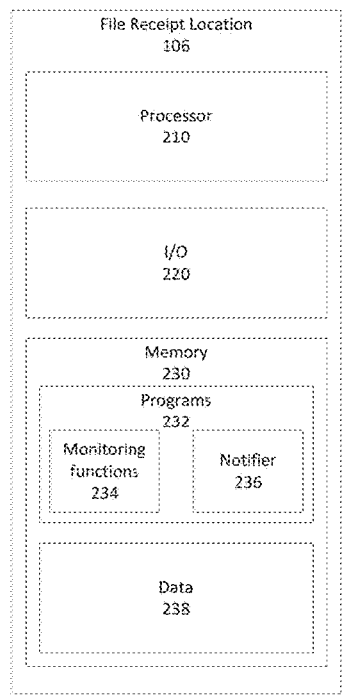
FIG. 2 is a diagram of an exemplary file receipt location, consistent with disclosed embodiments.

FIG. 2 is a diagram of an exemplary file receipt location, consistent with disclosed embodiments.

Referring in greater detail to FIG. 2, file receipt location 106 may be, in some embodiments, a secure drop point on a public cloud configured to receive files 104a-n comprising sensitive data. Consistent with disclosed embodiments, a "secure drop point" may be, in some embodiments, a file receipt location that comprises one or more security features discussed in further detail below. As shown, file receipt location 106 may include one or more processors 210, input/output ("I/O") devices 220, and memory 230 for storing programs 232 and data 238.

In FIG. 2, file receipt location 106 is a virtual location that comprises a set of physical memory units and processors. The memory units and processors may not be geographically proximate. That is, memory 230, including data 238, stored at file receipt location 106 may be stored at a plurality of physical facilities separated by a distance. For example, facilities comprising components of memory 230 may be separated by 10 kilometers or more. In some embodiments, secure file receipt location 106 may be implemented using, for example, Amazon S3®, Google Cloud Spanner®, Oracle Cloud Storage Classic®, Microsoft Azure Blob Storage®, IBM Cloud Object Storages, or other cloud storage platforms.

In the example of FIG. 2, file receipt location 106 communicates via I/O device 220 with cloud compute service 108 and a client device 102. Client device 102 is an example of client devices 102a-n of FIG. 1. It can be appreciated that I/O device 220 may comprise multiple I/O devices. Additionally, file receipt location 106 may communicate with other components of system 100 or other components not depicted in system 100.

In some embodiments, file receipt location 106 may be a single system or may be configured as a distributed computer system including multiple servers or computers that interoperate to perform one or more of the processes and functionalities associated with the disclosed embodiments. In some embodiments, file receipt location 106 is specially configured with hardware and/or software modules for performing functions of disclosed methods. File receipt location 106 also includes a notifier 236 configured to notify cloud computing service 108 upon receipt of a sensitive file 104 comprising sensitive data from client device. Sensitive file 104 may be encrypted. Sensitive file 104 is an example of sensitive files 104a-n of FIG. 1.

In some embodiments, file receipt location 106 includes monitoring functions 234 to detect data anomalies in file receipt location 106. Data anomalies may include data that fails internal consistency checks performed by monitoring functions 234 and may also include repeated failed attempts to access file receipt location 106.

Still referring to FIG. 2, programs 232 may include functions that allow users with access to the file receipt location 106 to use object based management to create metadata and tags associated with sensitive files 104. Alternatively, programs 232 may automatically generate metadata and tags. Metadata and tags may be based on the contents of sensitive file 104 or based on characteristics of client device 102. For example, metadata and tags may be based on an IP address of client device 102 or an identifying feature of client device 102.

In some embodiments, file receipt location 106 may be configured to receive instructions from cloud computer service 108 to destroy sensitive file 104. Alternatively, file receipt location 106 may be configured to destroy sensitive files 104 based on instructions from programs 232. Destroying sensitive file 104 may comprise immediately marking sensitive file 104 for permanent deletion, then permanently deleting sensitive file 104 and associated file pointers at a later point in time. For example, sensitive file 104 and associated file pointers may be deleted a number of days of after marking. In some embodiments, permanently deleting sensitive file 104 comprises wiping data by overwriting memory 230, including data 238 associated with sensitive file 104.

Figure 3:
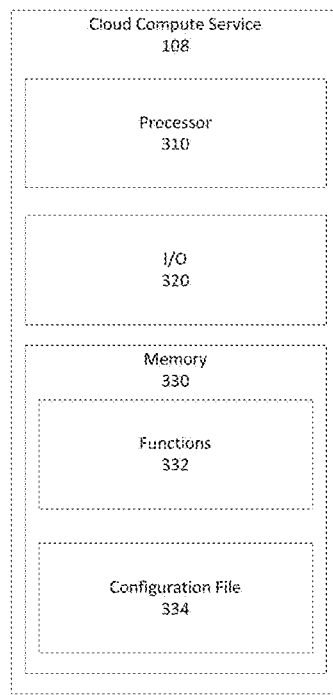
FIG. 3 is a diagram of an exemplary cloud compute service, consistent with disclosed embodiments.

FIG. 3 is a diagram of an exemplary cloud compute service 108, consistent with disclosed embodiments.

Referring to FIG. 3 in greater detail, cloud compute service 108 uses a serverless architecture for data processing of files, wherein the data processing includes stripping files of sensitive data. As shown, cloud compute service 108 may include one or more processors 310, input/output ("I/O") devices 320, memory 330 for storing functions 332 and configuration file 334.

In the embodiment of FIG. 3, cloud compute service 108 comprises a function as a service (FaaS) serverless architecture for event-driven computing. Cloud compute service 108 comprises underlying physical hardware including servers comprising memory and processing units physically separated and isolated in different locations. Advantageously, cloud compute service 108 provides low latency, high throughput, and highly redundant networking. In some embodiments, cloud compute service 108 has built-in fault tolerance and maintains compute capacity across multiple physical facilities to protect associated code and data from failures.

Examples of commercially available cloud compute services include AWS Lambda by Amazon®, Oracle Cloud®, Cloud Functions® by Google®, Azure Functions® by Microsoft®, Apache OpenWhisk®, or other cloud compute services. In some embodiments, to create functions 332, users may interact with native cloud compute service functions through terminals or shells using tools like, for example, AWS® Command Line Interface, Google's® gcloud command line tool, or Secure Shell (SSH).

In the embodiment of FIG. 3, cloud compute service 108 communicates via I/O device 320 with file receipt location 106 and container instances 110. Container instance 110 is an example of container instances 110a-n of FIG. 1. Additionally, cloud compute service 108 may communicate with other components of system 100 or other components not depicted in system 100. It will be appreciated by one skilled in the art that I/O device 320 comprises multiple ports that may be on the same or different physical devices. Cloud compute service 108 may scale and allocate additional or reduced I/O capacity as needed.

In the embodiment of FIG. 3, cloud compute service 108 is configured to receive a notification from file receipt location 106. Cloud compute service 108 is further configured to receive files 104 and may be configured to receive metadata and tags from file receipt location 106.

Consistent with the present disclosure, cloud compute service 108 is configured to run functions 332 to immediately process a stream of near continuously received sensitive files based on a configuration file 332. Functions 332 comprise functions that spin up, that is, generate, container instance 110 to process a job in response to an event trigger. Functions 332 may generate container instance 110 within milliseconds of a triggering event. In some embodiments, functions 332 further comprise functions that terminate the container instance following the completion of the job. Alternatively, functions 332 may provide code when generating container instance 110 that causes container instance 110 to automatically terminate at the completion of a job.

In some embodiments, cloud service 108 may assign a job comprising removing sensitive data from a sensitive file to a container instance that is already running, which is referred to as a warm container instance. That is, container instance 110 may be used to process more than one sensitive file 104. By using a warm container instance, cloud compute service 108 avoids generating new containers each time a function executes. This may improve efficiency and performance.

Consistent with the present disclosure, cloud service 108 determines whether to select a warm container instance or to generate a new container instance based on performance and security criteria. For example, cloud compute service 108 may select a warm container instance that meets performance criteria like, for example, a low estimated processing cost or short runtime. Alternatively, cloud compute service may generate a new container instance if no warm container instances are immediately available. Further, cloud compute service 108 may generate a new container instance and terminate an available warm container instance based on security criteria. As an example, security criteria may comprise comparing the total runtime is to a threshold runtime. Further, security criteria may comprise determining whether the total number of jobs performed exceeds a threshold number of jobs. As will be appreciated by one skilled in the art, other criteria may be used.

In some embodiments, cloud service 108 generates settings of container instance 110 and code to be run by container instance 110 based on configuration file 334. Settings and code may be further based on at least one of the contents of the sensitive file 104, a characteristic of the client device 102, or metadata or tags received from file receipt location 106.

Configuration file 334 may comprise at least one of a field name, a string location, or a string length associated with sensitive data. Configuration file 334 may be received from file receipt location 106. Alternatively, a remote device may upload configuration file 334 to cloud compute service 108 following an authentication process.

Still referring to FIG. 3, cloud service 108 is configured to receive reports from container instance 110 and to receive metadata and tags from file receipt location 106. In some embodiments, cloud service 108 maintains metrics associated with a plurality of container instances. Metrics may be based on at least one of a report received from a container instance, the timing and number of sensitive files received, and metadata or tags received from file receipt location 106. In some embodiments, the report comprises at least one of a job status or an error message.

Consistent with the present disclosure, in some embodiments, cloud service 108 is configured to terminate container instance 110 based on the report. For example, cloud service 108 may send an instruction to container instance 110, the instruction comprising a command to terminate. In some embodiments, cloud service 108 may send the instruction based on a job status of the report or based on an error message of the report.

In some embodiments, cloud service 108 may be configured to send instructions to file receipt location 106 to destroy sensitive file 104. Destroying sensitive file 104 may comprise permanently deleting sensitive file 104 and associated file pointers. In some embodiments, permanently deleting sensitive file 104 wiping data by overwriting memory associated with sensitive file 104.

Figure 4:
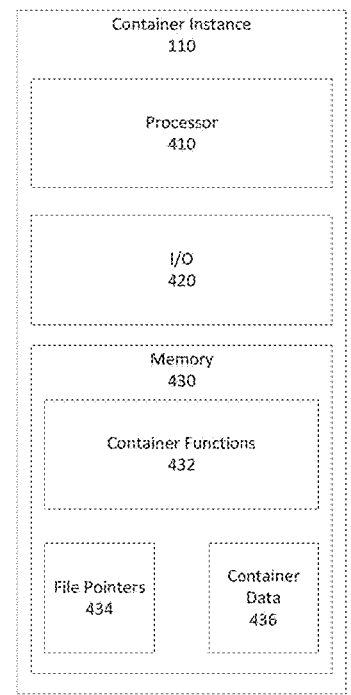
FIG. 4 is a diagram of an exemplary container instance, consistent with disclosed embodiments.

FIG. 4 is a diagram of an exemplary container instance 110, consistent with disclosed embodiments. Container instance 110 is an example of container instances 110a-n of FIG. 1. In some embodiments, container instance 110 may be an AWS Lambda® compute instance, Oracle Cloud® compute instance, Google Cloud Functions® virtual machine, Microsoft Azure Functions® host instance, Apache OpenWhisk® instance, or other container instance.

Referring to FIG. 4 in greater detail, container instance 110 is hosted on the serverless architecture of cloud compute service 108. Container instance 110 comprises one or more processors 410, input/output ("I/O") devices 420, and memory 430 for storing container functions 432, file pointers 434, and container data 436.

Container instance 110, in some embodiments, comprises a stand-alone, executable package that includes code, runtime, system tools, system libraries, and settings that is configured to execute a job, the job comprising stripping sensitive data from files. Container instance 110 may be scaled by functions 332 of cloud compute service 108 to include a number of processors 410 and an amount of memory 430. The number of processors 410 and amount of memory 430 may be based on an estimated size of a job. Container instance 110 is configured to execute functions written in one or more programming languages, including JAVASCRIPT, C, C++, JAVA, PHP, PYTHON, RUBY, PERL, BASH, or other programming languages. Container instances are ephemeral and may run for a single job or a series of jobs.

Container instance 110 is a closed container. That is, container instance 110 blocks attempts to access the container and does not permit access from outside using terminals or remote shell tools like SSH, RTP, FTP, or Curl, for example. Accordingly, container instance 110 provides security benefits to system 100.

Consistent with the present disclosures, container instance 110 may receive a series of jobs consecutively from cloud compute service 108, the jobs comprising removing sensitive data from a plurality of files. That is, container instance 110 may be used as a warm instance by cloud compute service 108. This has the advantage of reducing runtime and data processing costs.

In the example embodiment of FIG. 4, container instance 110 communicates via I/O device 420 with the cloud compute service 208 and a data storage location 114. Container instance 110 may communicate with other components of system 100 or other components not depicted in system 100, including with other container instances.

In some embodiments, container instance 110 may send a report to cloud compute service 108 via I/O device 420. For example, container instance 110 may send a report based on assessed criteria by container functions 432 while executing the job. Alternatively, container instance 110 may send the report in response to a query from the cloud compute service. The report may comprise at least one of a job status or an error message.

In some embodiments, container instance 110 comprises one or more environment variables, that is key-value pairs. Compute cloud service 108 may pass values to container instance 110 to set environment variables. Environment variables may be encrypted.

In some embodiments, container instance 110 decodes or decrypts sensitive file 104.

Container functions 432 comprise code to strip sensitive data from sensitive file 104 and generate stripped file 112. Stripped file 112 is an example of stripped files 112a-n of FIG. 1. In some embodiments, container functions 432 may include code to perform additional operations when generating stripped file 112. For example, container functions 432 may comprise code to include information related to the received metadata and tags in stripped file 112. In some embodiments, container functions 432 may include code to perform data analysis on data contained in sensitive file 104 and include results of the data analysis in stripped file 112. Further, container functions 432 include code that performs operations based on environment variables. As will be appreciated by one skilled in the art, container functions 432 may include code to perform further operations when generating stripped file 112.

In some embodiments, container functions 432 may include code to generate a second stripped file comprising different information than the information contained in stripped file 112. For example, container functions 432 may generate stripped file 112c and 112c' as shown in FIG. 1, wherein stripped file 112c' includes some sensitive data not found in stripped file 112c. That is, files 112c and 112c' comprise different levels of data stripping.

In the embodiment of FIG. 4, container instance 110 is configured to transmit stripped file 112 to one or more data storage locations 114 via I/O device 420.

Terminating container instance 110 may comprise removing (e.g., erasing, overwriting, or the like) data associated with the job, including container data 436 stored on memory 430 and file pointers 434 associated with container data. The information removed may comprise information contained in sensitive file 104 and in stripped file 112.

FIG. 5A is a flowchart of an exemplary data process at a file receipt location, consistent with disclosed embodiments.

Data process 500 is described herein as performed primarily by file receipt location 106. For example, processor 210 of file receipt location 106 may perform some or all steps of process 500. It is to be understood, however, that in some embodiments another device may perform one or more steps of process 500, such as an administrative server or controller (not shown in figures). In other embodiments, multiple devices may perform steps of process 500 in a distributed-computing system.

Process 500 may begin in step 502, in which a file comprising sensitive data 104 is received at file receipt location 106. Sensitive file 104 may be encoded or encrypted. In some embodiments, a user manually transmits sensitive file 104 to from client device 102 to file receipt location 106. Alternatively, in some embodiments, client device 102 automatically transmits file 104 to file receipt location 106. File 104 may originate at client device 102. Alternatively, file 104 may originate outside client device 102 and first be received at client device 102 then transmitted to file receipt location 106 by client device 102. Sensitive file 104 is stored in data 238 using one or more methods of encryption.

At step 504, metadata and tags may be added to sensitive file 104. In some embodiments, metadata and tags are added manually by users. Alternatively, metadata and tags may be added automatically by processors 210 according to programs 232. For example, sensitive file 104 may be tagged as transmitted by a specific vendor or service provider like, for example, Visa® or Mastercard®. As further examples, sensitive file 104 may be tagged as restricted, tagged for aggregation, tagged for encryption, or tagged as relating to a specific configuration file. Metadata or tags may indicate that a sensitive file belongs to a class. In some embodiments, no metadata or tags are added at step 504.

At step 506, file receipt location 106 transmits a push notification to cloud compute service 108 notifying cloud compute service 108 that sensitive file 104 has been received at file receipt location 106. The push notification may comprise a file identifier associated with sensitive file 104 and may further comprise metadata or tags added at step 504.

In step 508, file receipt location 106 grants cloud compute service 108 access to sensitive file 104. In some embodiments, granting access comprises receiving a request from cloud compute service 108 at file receipt location 106, the request comprising an authentication credential, and transmitting sensitive file 104 to cloud compute service 108.

In some embodiments, granting access to sensitive file 104 comprises transmitting sensitive file 104 to cloud compute service 108 automatically, without receiving a request. Step 508 may be performed simultaneously with step 506.

In step 510, file receipt location 106 receives an instruction comprising a command to destroy sensitive file 104. In some embodiments, the instruction further comprises at least one of security credentials or commands to destroy more than one sensitive file 104. In some embodiments, programs 232 of the file receipt location 106 generate the instruction. For example, programs 232 may generate the instruction at a predetermined time, or programs 232 may generate the instruction automatically upon transmittal of file 104 to cloud compute service 108 at step 508. Alternatively, cloud compute service 108 may generate the instruction and transmit the instruction to file receipt location 106.

At step 512, file receipt location 106 destroys sensitive file 104 in response to the instruction. In some embodiments, destroying sensitive file 104 comprises permanently deleting file 104 and associated file pointers immediately. Alternatively, destroying sensitive file 104 may comprise marking sensitive file 104 for permanent deletion, then permanently deleting file 104 and associated file pointers at a later point in time. For example, sensitive file 104 and associated file pointers may be deleted a number days of after marking. In some embodiments, permanently deleting sensitive file 104 comprises wiping data by overwriting memory 230 and data 238 associated with sensitive file 104.

FIG. 5B is a flowchart of an exemplary data process for removing sensitive data from a file at a cloud compute service, consistent with disclosed embodiments.

Data process 550 is described herein as performed primarily by cloud compute service 108 and container instance 110. For example, processor 310 running function 332 and processor 410 running container functions 432 may perform some or all steps of process 550. It is to be understood, however, that in some embodiments one or more additional processors or devices may perform steps of process 550 (not shown in figures).

Process 550 is triggered at step 552, in which cloud compute service 108 receives a push notification from file receipt location 106. The notification comprises a file identifier of sensitive file 104 and may further comprise metadata or tags.

At step 554, cloud compute service 108 determines whether to generate container instance 110 to execute a job or to select a warm container instance to execute the job. The job comprises removing sensitive data from sensitive file 104. In some embodiments, the determination is based on at least one of performance criteria or security criteria. As an example, performance criteria may comprise a latency measure for generating a new container instance. Security criteria may comprise comparing a number of jobs completed by a warm container instance to a threshold number of jobs. Further, security criteria may comprise comparing the total runtime of a warm container instance to a threshold runtime.

Based on the determination at step 554, cloud compute service 108 may generate, i.e. spin up, new container instance 110 at step 556. Consistent with disclosed embodiments, generating container instance 110 at step 556 comprises creating a stand-alone, executable package that includes code, runtime, system tools, system libraries, and settings configured to execute a job comprising stripping sensitive data from files.

As an alternative to step 556, cloud compute service 108 may select a warm container instance at step 557 based on the determination at step 554. Selecting a warm container instance at step 557 comprises selecting a container instance previously generated by cloud compute service 108 according to the processes of step 556.

At step 558, cloud compute service 108 assigns the job to container instance 110 based on the decision at step 554. Assigning the job comprises providing the file identifier of sensitive file 104. In some embodiments, assigning the job may comprise generating settings of container instance 110 and code to be run by container instance 110 based on configuration file 334. In some embodiments, step 558 may be performed simultaneously with step 556.

At step 560, container instance 110 retrieves sensitive file 104. In some embodiments, retrieving sensitive file 104 comprises sending a request to file receipt location 106 and receiving sensitive file 104 in response to the request. The request comprises the file identifier and may further comprise an authentication credential. In other embodiments, file receipt location 106 transmits sensitive file 104 to cloud compute service 108 automatically at step 560, without receiving a request, and cloud compute service 108 provides sensitive file 104 to container instance 110.

At step 562, container instance 110 generates stripped file 112 based on sensitive file 104. Generating stripped file 112 comprises stripping sensitive data from sensitive file. In some embodiments, generating stripped file comprises decoding or decrypting sensitive file 104. Stripped file 112 is based on configuration file 334 and may be further based on metadata or tags. Generating stripped file 112 may further comprise performing data analysis on data contained in sensitive file 104 and including a result of the data analysis in stripped file 112.

In some embodiments, as part of step 562, container instance 110 may send a report to cloud compute service 108, the report comprising at least one of a job status or an error message.

Further, in some embodiments, not depicted in FIG. 5B, there is an optional step wherein cloud compute service 108 terminates container instance 110 based on the received report, and steps 554-562 are repeated.

Consistent with disclosed embodiments, step 562 may further comprise generating a second stripped file, the second file differing from the first.

At step 564, container instance 110 transmits stripped file 112 to one or more storage locations 114. Transmitting stripped file 112 may comprise encoding or encrypting stripped file 112. Step 564 may further comprise transmitting a second stripped file to one or more storage locations 114.

At step 566, container instance 110 may be terminated. In some embodiments, container instance 110 is configured to terminate automatically at completion of a job, the job comprising stripping sensitive data from sensitive file 104. Alternatively, container instance 110 may be configured to terminate based on a termination command received from cloud compute service 108.

Terminating container instance 110 may comprise sending a report to cloud compute service 108, the report comprising at least one of a job status or an error message.

Terminating container instance 110 comprises deleting files and associated file pointers in container instance memory and may further comprise overwriting memory blocks in container instance memory. The deleted files comprise a copy of sensitive file 104 and a copy of stripped file 112.

At any point prior to step 566, cloud compute service 108 may assign a further job from cloud compute service 108, the further job comprising removing sensitive data from a received file. Following assignment of the further job, container instance 110 performs steps 558-564. The process of assigning a further job and performing steps 558-562 may repeat a number of times until the container instance is terminated at step 566.

Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

Computer programs based on the written description and methods of this specification are within the skill of a software developer. The various programs or program modules can be created using a variety of programming techniques. For example, program sections or program modules can be designed in or by means of Java, C, C++, NodeJS, C#, GO, Python, Ruby, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system comprising a cloud compute service for executing jobs immediately upon receipt of a notification, the cloud compute service comprising:
   one or more hardware processors; and
   a memory unit storing instructions executable by the one or more hardware processors to perform operations comprising:
      receiving, at the cloud compute service, a first notification that a first sensitive file comprising sensitive data has been received at a file receipt location, the first sensitive file being sent by a client device;
      selecting, by the cloud compute service, a warm container instance for completing a first job comprising stripping the sensitive data from the first sensitive file;
      assigning, by the cloud compute service, the first job to the warm container instance;
      retrieving, by the warm container instance, the first sensitive file from the file receipt location;
      generating, by the warm container instance, a first stripped file by stripping the sensitive data from the first sensitive file based on a configuration file;
      transmitting, by the warm container instance, the first stripped file to a storage location;
      deleting the first sensitive file from the file receipt location; and
      terminating the warm container instance, wherein terminating the container instance comprises deleting files comprising sensitive data.

2. The system of claim 1, wherein selecting the warm container instance is based on at least one of performance criteria or security criteria.

3. The system of claim 2, wherein the security criteria comprises at least one of comparing the total runtime of the warm container instance to a threshold runtime or comparing the total number of jobs performed to threshold number of jobs.

4. The system of claim 2, wherein the performance criteria comprises at least one of an estimated processing cost or an estimated runtime.

5. The system of claim 1, the operations further comprising, prior to terminating the warm container instance:
   receiving a second notification that a second sensitive file comprising sensitive data has been received at the file receipt location, the second sensitive file received from a client device;
   selecting, by the cloud compute service, the warm container instance for completing a second job comprising stripping the sensitive data from the second sensitive file;
   assigning, by the cloud compute service, the second job to the warm container instance;
   retrieving, by the warm container instance, the second sensitive file from the file receipt location;
   generating, by the warm container instance, a second stripped file by stripping the sensitive data from the second sensitive file based on a second configuration file;
   transmitting, by the warm container instance, the second stripped file to a second storage location; and
   deleting the second sensitive file from the file receipt location.

6. The system of claim 5, wherein the second configuration file is the same as the first configuration file.

7. The system of claim 5, wherein the second storage location is the same as the first storage location.

8. The system of claim 1, wherein the each of the first storage location is accessible to users who complete an authentication process.

9. The system of claim 1, wherein the terminating is based on security criteria, the security criteria comprising at least one of comparing the total runtime of the warm container instance to a threshold runtime or comparing the total number of jobs performed to threshold number of jobs.

10. The system of claim 1, wherein the stripping is further based on an environment variable.

11. The system of claim 1, wherein terminating the warm container instance further comprises wiping data by overwriting memory blocks.

12. The system of claim 1, wherein deleting the first sensitive file comprises deleting file pointers associated with the first sensitive file, the file pointers indicating the memory address of blocks of sensitive data.

13. The system of claim 5, wherein deleting the second sensitive file comprises deleting file pointers associated with the second sensitive file, the file pointers indicating the memory address of blocks of sensitive data.

14. The system of claim 12, wherein deleting the first sensitive file further comprises overwriting memory blocks associated with the first sensitive file.

15. The system of claim 13, wherein deleting the second sensitive file further comprise overwriting memory blocks associated with the second sensitive file.

16. A non-transitory computer readable medium having stored instructions, which when executed, cause at least one processor to perform operations comprising:
   receiving, at the cloud compute service, a first notification that a first sensitive file comprising sensitive data has been received at a file receipt location, the first sensitive file being sent by a client device;
   selecting, by the cloud compute service, a warm container instance for completing a first job comprising stripping the sensitive data from the first sensitive file;
   assigning, by the cloud compute service, the first job to the warm container instance;
   retrieving, by the warm container instance, the first sensitive file from the file receipt location;
   generating, by the warm container instance, a first stripped file by stripping the sensitive data from the first sensitive file based on a configuration file;
   transmitting, by the warm container instance, the first stripped file to a storage location;
   deleting the first sensitive file and associated file pointers from the file receipt location; and
   terminating the warm container instance, wherein terminating the container instance comprises deleting files comprising sensitive data and associated file pointers.

* * * * *